July 10, 1956

N. RANSOHOFF 2,753,977

FEEDING APPARATUS FOR NAIL WEIGHING MACHINES

Filed July 16, 1952

INVENTOR
Nathan Ransohoff.
BY
Wood, Herron & Evans.
ATTORNEYS.

July 10, 1956 — N. RANSOHOFF — 2,753,977
FEEDING APPARATUS FOR NAIL WEIGHING MACHINES
Filed July 16, 1952 — 4 Sheets-Sheet 2

INVENTOR.
Nathan Ransohoff.
BY Wood, Herron & Evans.
ATTORNEYS.

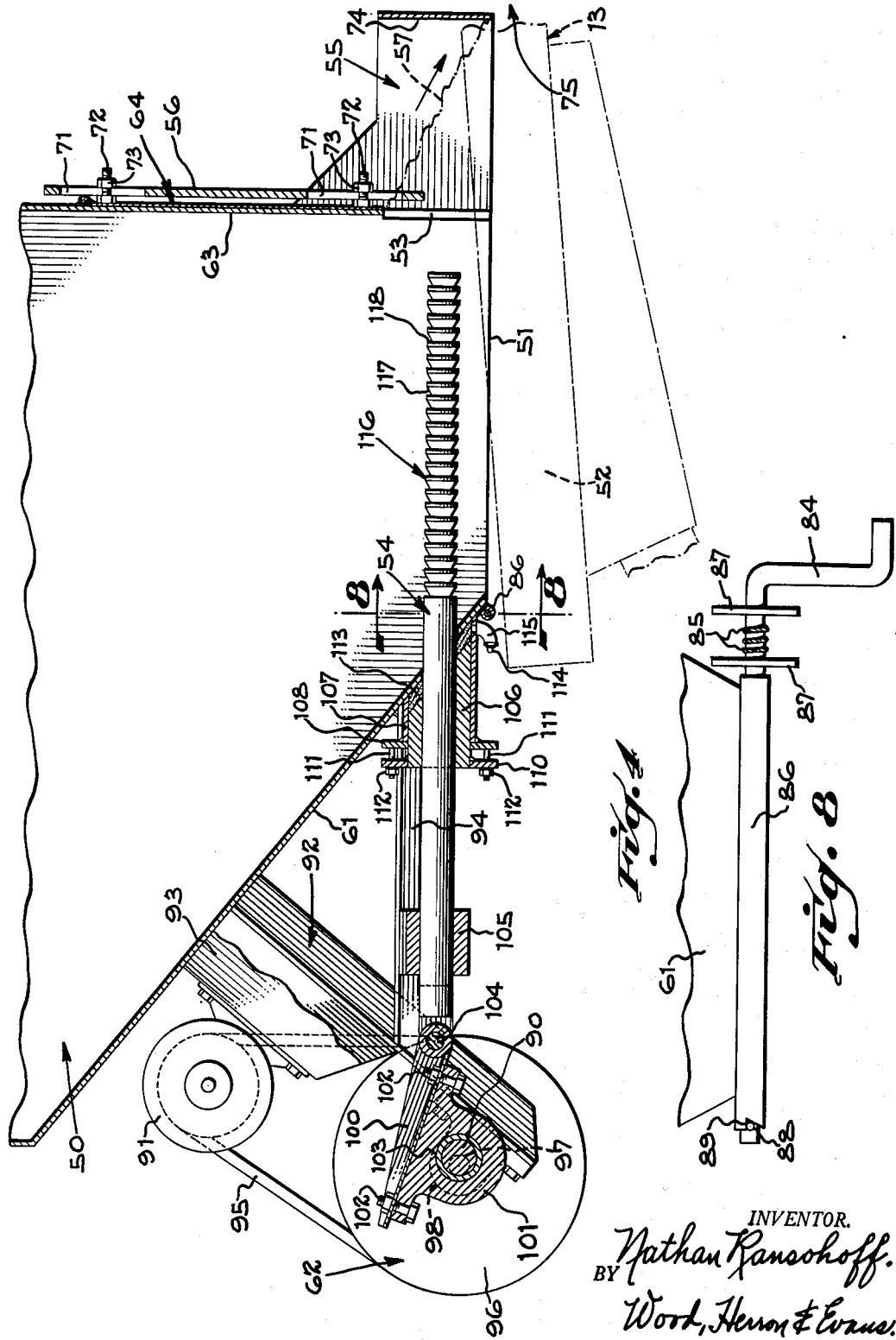

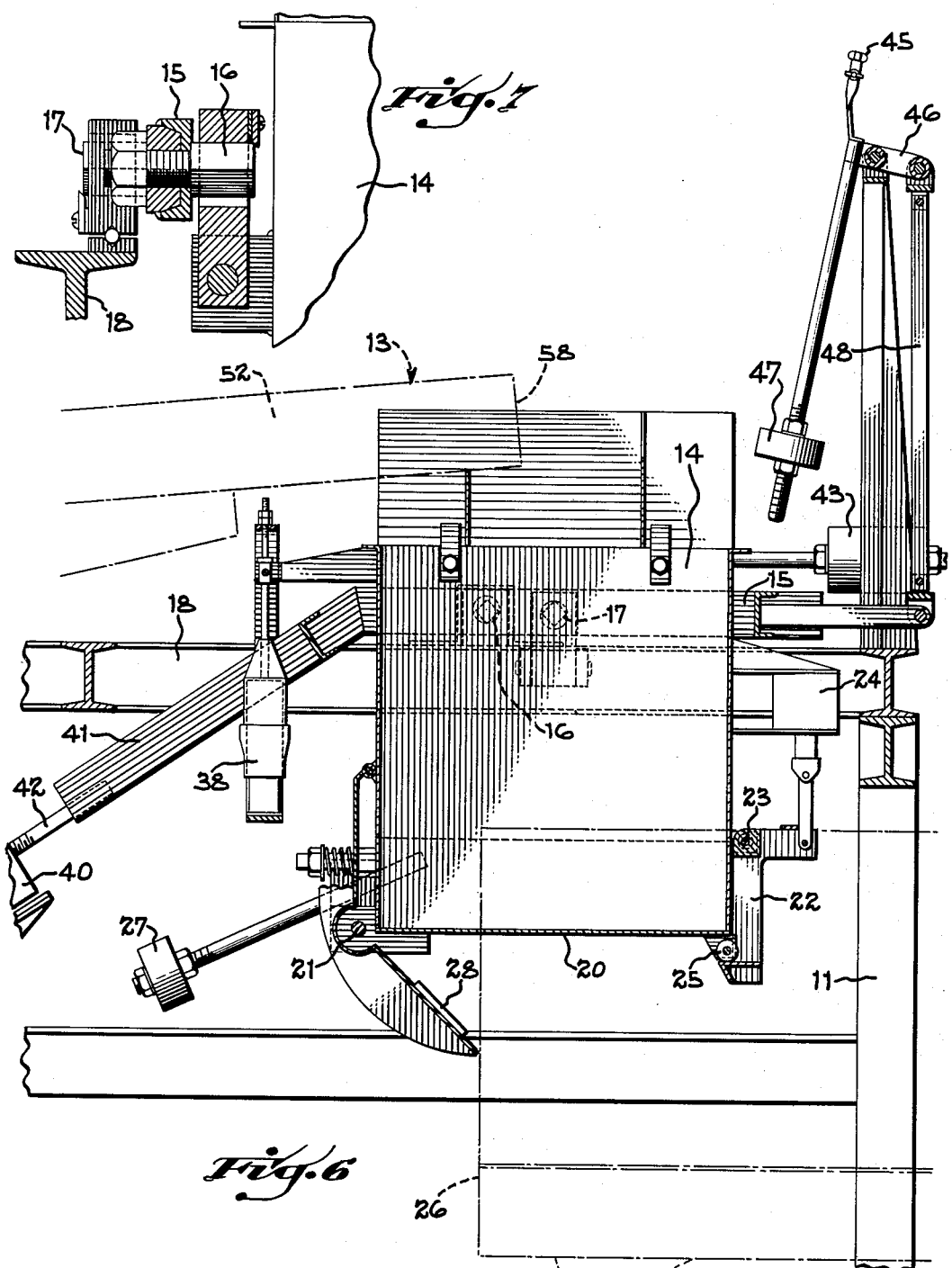

United States Patent Office 2,753,977
Patented July 10, 1956

2,753,977

FEEDING APPARATUS FOR NAIL WEIGHING MACHINES

Nathan Ransohoff, Cincinnati, Ohio, assignor to N. Ransohoff, Incorporated, Cincinnati, Ohio, a corporation of Ohio Application July 16, 1952, Serial No. 299,300

11 Claims. (Cl. 198—56)

This invention relates to automatic machinery for weighing out and delivering to a container successive batches of nails, spikes, and similar metallic objects. The invention is directed in particular to a feeding apparatus which is adapted to receive nails delivered in commingled bulk quantities and to advance them at a controlled rate to the weighing equipment to be weighed and discharged into the container in uniformly measured batches.

A primary object of the invention has been to provide a nail feeding apparatus which serves as a reservoir and which reliably advances the nails in a constant stream in spite of irregular bulk deliveries, so as to allow the weighing machine to react accurately to a gradually increasing weight load and terminate the feed when a predetermined batch of nails has been advanced and weighed.

During manufacture, the nails are handled usually by conveyer equipment, or sometimes by hand, in commingled bulk quantities. This causes them to be impacted or entangled with one another in self-sustaining masses which are extremely difficult to handle.

It is a further object of the invention therefore to provide a feeding apparatus which is adapted to disentangle the jumbled mass of nails before or during their advancement from the feeding apparatus such that they may be advanced as a relatively uniform stream to the weighing machinery.

In order to illustrate the operating principles of the feeding apparatus, it is disclosed in conjunction with a weighing machine consisting of a weigh bucket and a vibrating conveyer. The feeding apparatus is associated with the vibrating conveyer, the two parts cooperating to feed and advance the nails at a relatively constant flowing stream to the weigh bucket. The bucket in turn is poised upon a counterweighed scale beam and is adapted to dip upon being overbalanced by a predetermined weight load of nails in the bucket. Electric limit switches, associated with the scale beam, are interconnected with the vibrating conveyer and arranged to decommission the conveyer when the bucket is loaded to its predetermined setting.

The weigh bucket includes a hinged trap door which normally sustains the nails in the bucket, there being provided a solenoid operated latch which holds the trap door in closed position. The solenoid is electrically connected with the scale beam limit switches such that the trap door is unlatched when the beam overbalances and stops the conveyer. This causes the weighed batch of nails to be discharged by gravity from the bucket and conditions the machine for the next cycle of operation. The nails which discharge from the weigh bucket when the trap door opens are conveyed to a shipping container or nail keg which has a capacity usually of one hundred pounds.

In order to provide rapid reliable operation and at the same time weigh out the nails in accurately measured batches, the conveyer is adapted to feed the nails at a rapid rate during the advancement of the major portion of the load to the weigh bucket, and for more accurate measurement, to advance the remainder at a relatively slow or dribble rate until the load reaches its final limit.

In the present disclosure, the weighing machine forms the last station of a production line used in the manufacture and treatment of nails. After being fabricated initially, the nails advance through a series of treating machines consisting, for example, of tumbling machines, washing machines, dryers, and in some cases surface treating or coating machines. At the end of the treatment line, they pass in irregular batches to the feeding apparatus and then to the weighing machine to be weighed and packaged.

As explained above, the batches must be weighed accurately; thus the irregular discharge from the treating machines or the bulk delivery by handling equipment prohibits the transfer of the nails directly to the weigh bucket. If batches of nails were advanced to the bucket during the dribble feed, then the sudden weight increase of an entangled mass of nails would overload the bucket beyond its load setting, causing overweight measurement; obviously accurate weighing depends upon uniform but slow weight increase, particularly during the last portion of the cycle.

As indicated above, the handling of nails and spikes poses a peculiar problem since the nails in a batch have a natural tendency to entangle themselves with one another, forming a self-sustaining mass which is reformed into a flowing stream only with great difficulty. This tendency is demonstrated when it is attempted to pick up a few nails of a batch by hand. As they are lifted, other nails of the commingled batch will adhere, and a considerable number of additional nails, all entangled in a jackstraw fashion with one another, are extracted as a self-supporting mass. The condition arises because each nail or spike, as distinguished from tacks, includes a head and a pointed shank having a series of annular ribs beneath the head. All of these projections and irregular surfaces tend to interlock with one another when the nails are jumbled together in a mass.

The problem is more difficult in handling the larger nail sizes since their length and projecting surfaces are proportionately larger. For example, standard wire nails of the twopenny size, which are one inch long, are difficult to handle; however spikes running from tenpenny and upward are more troublesome since they are three inches and longer and consequently the jackstraw effect is much greater.

Described briefly, the feeding apparatus consists of a feed hopper disposed generally upon a vertical axis having mechanical means for disentangling the mass of nails and feeding them from the hopper at a controlled rate, combined with the vibratory conveyer for advancing them to the weigh bucket. It has been determined that the batches of nails accumulated in the feed hopper can be advanced in a reliable fashion by providing a plunger reciprocating on a horizontal axis in the lower portion of the hopper in axial alignment with a discharge opening leading to the vibrating conveyer. The plunger enters the hopper from the back wall and the forward portion of the plunger, which reciprocates within the hopper, has a series of annular grooves configurated to provide substantially square shoulders facing toward the discharge opening in the forward direction of motion, and having sloping or tapered surfaces facing in the rearward direction. This grooved arrangement is found to agitate and partially disentangle the nails in the hopper during rearward motion of the plunger, and during forward motion, advance them forwardly through the discharge opening to the vibrating conveyer.

Cooperating with the plunger is a yieldable guard which extends from the discharge opening forwardly, having an end wall extending across the conveyer at a predetermined elevation above the conveyer surface. The end wall of the guard reduces to a relatively uniform level the stream of nails moving toward the weigh bucket. The lower side edges of the guard are disposed within the confines of the conveyer to prevent the nails, which issue from the discharge opening in a downwardly inclined angle of motion, from spilling over the sides of the conveyer. The guard is yieldable in the forward direction of plunger movement to prevent damage to the nails which may be impacted between the end wall and plunger and also to prevent damage to the feed apparatus due to impacted wads of nails in the discharge area.

In addition to the yieldable guard, there is also provided a yieldable vertical breaker bar externally of the hopper, the lower end of which projects downwardly in a position to engage the advancing stream of nails as they issue from the discharge opening and before they reach the end wall of the guard. The breaker bar is effective to further separate nails which issue through the discharge opening in jackstraw formation so that they may be leveled by the end wall upon reaching it.

Briefly, therefore, the reciprocating plunger produces a unidirectional stepwise advancement of the nails forwardly toward the discharge opening and at least partially disentangles the jumbled nails. The breaker bar externally of the discharge opening, further reduces and separates the advancing nails which remain in tangled condition. Finally the guard which extends forwardly of the breaker bar, is effective to prevent spillage and reduce to a relatively uniform level, the nails after advancement beyond the breaker bar.

The hopper is disposed generally upon a vertical axis above the horizontal conveyer and the discharge opening extends from a vertical wall and across the lower end of the hopper, providing an open lower end communicating with the conveyer surface. Thus the nails in the hopper are supported, at least partially, by the vibrating surface and this imparts vibratory motion to the nails in the lower portion of the hopper to aid in feeding them downwardly through the hopper.

In order to render more positive the downward movement of the nails through the hopper toward the reciprocating plunger, and conveyer, the hopper is provided with a vibrating wall along one or both sides. When a batch of nails is dumped into the hopper, there is a tendency for the entangled batches to wedge themselves across the side walls in the upper portion of the hopper. The vibrating wall prevents the nails from jamming and thus insures downward movement so that the plunger and vibrating conveyer can act upon them.

Various other features and advantages of the invention are brought out more clearly in the following detailed description in conjunction with the drawings:

Figure 4 is an enlarged sectional view, taken on line 4—4 Figure 2, detailing the lower portion of the feed hopper, particularly the ram, its driving system, and the yieldable guard structure.

Figure 5 is a fragmentary end view as projected from Figure 1, further illustrating the yieldable gate of the supply hopper.

Figure 6 is an enlarged fragmentary view taken on line 6—6 Figure 3, illustrating the weigh bucket and associated mechanism.

Figure 7 is a sectional view taken on line 7—7 Figure 1, detailing the knife edge bearings of the scale beam and weigh bucket.

Figure 8 is a fragmentary sectional view taken on line 8—8 Figure 4, detailing the spring adjustment crank of the yieldable guard structure.

*General arrangement*

Figure 1:
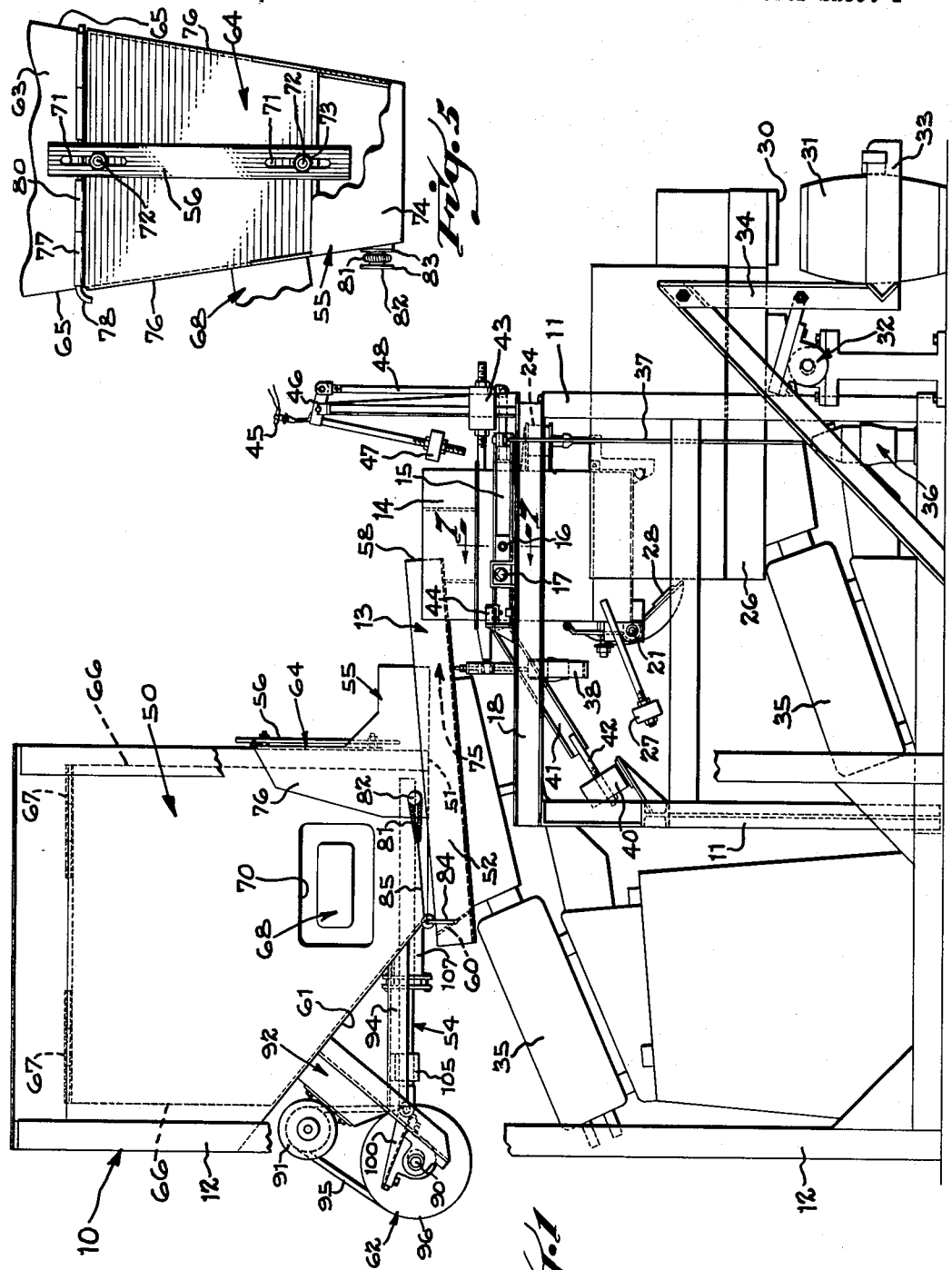
Figure 1 is a side elevation illustrating a nail weighing machine incorporating the present feed apparatus for advancing the nails to the weigh bucket of the weighing machine.
Figures 2, 3:
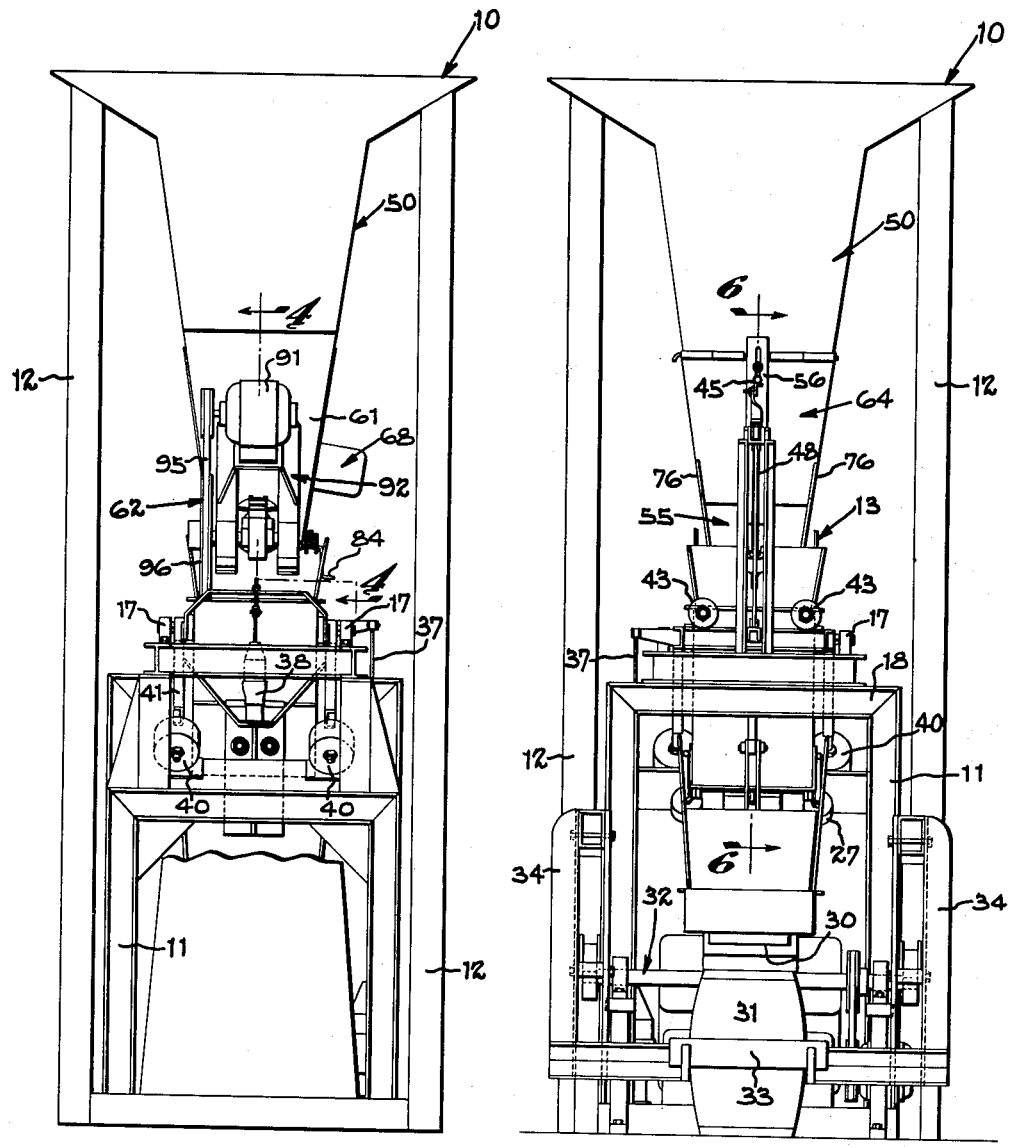
Figure 2 is an elevation as viewed from the rear end of Figure 1, further illustrating the general arrangement of the machine.
Figure 3 is an elevation similar to Figure 2 as viewed from the opposite or forward end of the machine.

As explained earlier, the present invention resides particularly in the nail feeding apparatus indicated generally at 10 in Figure 1; however, in order to bring out clearly its structure and operation, the feed mechanism is disclosed in relation to a complete nail weighing machine with which it co-operates. The following brief description of the nail weighing machine is intended to bring out the difficult problems involved in weighing nails and the related structural and functional features of the feed mechanism in order to exemplify its utility. It will be understood that the weighing mechanism itself forms no part of the invention and that the feeding apparatus is not limited in its utility to this particular machine.

Described generally, the nail weighing machine comprises a structural steel framework indicated at 11, having at its rearward end, an upright structure 12 rising above the frame 11 to mount the feed mechanism in operating position in a plane above the components of the weighing machine. As explained in detail later, the feed mechanism 10 includes a vibrating conveyer 13 extending generally in a horizontal plane to the weigh bucket 14, such that the nails issuing from the feed mechanism are advanced at a uniform rate to the weigh bucket. The conveyor 13 has an open forward end, and the advancing nails drop by gravity from the forward end into the weigh bucket.

The weigh bucket, which has an open top, is poised in a vertical axis upon a pivotally mounted saddle or scale beam 15 by means of knife edge bearings 16—16 at opposite sides, such that the weight load of the bucket is transmitted to the saddle. The saddle in turn is balanced upon corresponding knife edge bearings 17—17 which are mounted upon the beams 18—18 of frame 11. The structural details of these bearings are best disclosed in Figure 7.

The saddle is suitably counter-balanced and thus acts as a scale beam which tilts when a predetermined weight load of nails is advanced to it. Electric limit switches, as explained later, are effective to stop the conveyor 13 and discharge the nails from the bucket when the predetermined weight load is accumulated in the bucket.

As best shown in Figure 6, the weighed batch of nails in the weigh bucket, is discharged by way of the trap door 20 which is hingedly mounted as at 21 at the bottom of the bucket. The trap door is latched in closed position by the bell crank lever 22, pivotally mounted as at 23 to the bucket, and controlled by the solenoid 24. Upon being energized, the solenoid retracts the bell crank lever, releasing its engagement with the roller 25 which is carried by the trap door. This allows the charge of nails to drop by gravity from the bucket to the bottom vibrating conveyer 26 (Figure 1). The trap door is provided with a counter weight 27 adapted to swing the door by gravity to closed position after discharge of the nails. A yieldable stop 28 is arranged to limit and cushion the trap door when it swings downwardly to open position under the weight load of the nails.

Upon being dumped upon the bottom conveyer 26, the nails are advanced forwardly across the conveyer to its discharge end 30 where they drop by gravity directly into the nail keg 31. In order to pack down the nails in the keg as they are delivered, vibratory motion is imparted to the keg by means of a motor driven eccentric indicated generally at 32 (Figure 1). The keg is clamped in a fixture 33 fastened upon the lower end of a swinging arm 34 which is pivotally connected intermediate its length to the motor driven eccentric 32.

The top and bottom conveyers 13 and 26 are of conventional design, and each is vibrated by means of an electric vibrator coil indicated at 35. Each conveyer consists generally of a trough which is connected to the electric coils, the coils being arranged to vibrate the troughs along a line whch is angularly related to the plane of the trough upwardly toward the discharge end so as to progressively advance the nails across the trough.

In order to dampen the pivotal motion of saddle 15, a dashpot indicated generally at 36 is connected by means of a rod 37 to the forward end of the saddle. The dashpot is of the hydraulic piston and cylinder type, providing controlled leakage of fluid upon movement of the piston. The arrangement is such that there is practically no resistance at a slow rate of movement while the resistance increases with the rate of movement; therefore the dashpot does not interfere with the relatively slow movement of the saddle under the increasing weight load of nails, but is effective to prevent rapid return and oscillating movements.

A second dashpot 38, having its cylinder connected to the saddle is adapted to prevent swinging movements of the weigh bucket with respect to the saddle. The construction and operation of dashpot 38 is similar to the dashpot 36 and its function is to stabilize the bucket especially during its dumping operation.

As best shown in Figures 1 and 6, the saddle includes a counter-weight 40 mounted upon an arm 41 and adjustable upon the screw threaded rod 42 for setting the weight capacity. A counterweight 43 also extends outwardly in the opposite direction from the weigh bucket and adapted to counterbalance and poise the bucket upon its vertical axis.

The operation of conveyer 13 is under the control of a micro-switch 44 (Figure 1) mounted upon beam 18 and adapted to be tripped when the weight load of the nails overbalances the counterweighed saddle. In addition to switch 44, there is also provided a mercury switch 45 mounted upon a lever 46 which includes a counterweight 47. A link 48 extends from the saddle to the lever 46, and is arranged to transmit the preliminary downward movement of the saddle and weigh bucket to the lever and mercury switch to trip the mercury switch. The mercury switch is interconnected electrically with the coil 35 with the top conveyer 13, and is arranged to reduce the vibrations so as to provide a dribble feed as the weight load of the nails in the weigh bucket approaches the final limit to provide greater sensitivity.

In order to provide this operation, the mercury switch may be connected across a resistor in the circuit leading to the vibrator coil. At the start of the operation, the resistance is shunted by the mercury switch, and the vibrator receives the full line potential so as to vibrate the conveyer vigorously. When the weigh bucket is substantially loaded and begins to dip, the movement is transmitted to the mercury switch, whereupon the switch opens the shunt across the resistance, causing the potential to the vibrator to be reduced to provide the dribble feed. This continues until the weigh bucket dips further, causing it to trip the micro-switch 44 when the final weight limit is reached, thus causing the vibrator circuit to be opened to stop the conveyer. The micro-switch also is interconnected with the solenoid 24 and is arranged to energize it and discharge the nails to the second conveyer when the switch is tripped.

As explained earlier, the nail weighing machine is intended primarily but not exclusively for use in connection with automatic treating equipment so as to weigh the nails and feed the weighed batches of nails to their kegs or containers for shipment in a continuous automatic operation. In other cases, batches of nails may be dumped at random into the feed mechanism either by hand or by mechanical handling equipment. In passing through the treating apparatus, the nails may be tumbled, washed, dried, and in some cases surface treated. The nails are advanced by means of conveyers through the various treating equipment and finally discharged heterogeneously into the feed mechanism 10, usually in batches.

The weighing machine is intended to weigh out the nails accurately; consequently it is necessary that the nails be advanced by the top conveyer 13 in a fairly uniform stream in order that the apparatus may respond to a gradually increasing weight increase as the weigh bucket is filled. In other words, the nails must be advanced at a rapid, but uniform rate during the initial loading of the weigh bucket, and must be dribbled in at a slow rate during the final phase of the cycle after the weigh bucket has dipped sufficiently to trip the mercury switch.

It will be apparent therefore, that accurate and rapid weighing of the nails depends upon the advancement of the nails at a uniform rate by the feed apparatus 10. In other words, it is the function of the feeder to accumulate a bulk quantity of the nails for uniform advancement, so as to absorb the variations in supply and provide a constant controlled flow of nails to the weigh bucket.

In handling nails, particularly those of larger size as distinguished from tacks and the like, there is a pronounced tendency for them to become entangled with one another. If masses of entangled nails were discharged to the weigh bucket, then precise weighing would be impossible, particularly during the final slow feed, since delivery of a mass of nails to the bucket would cause it to be overcharged. Thus in order to provide accurate weighing, the feed mechanism must accumulate the batches of entangled nails and break down the batches before they can be advanced to the weigh bucket.

Feed mechanism

Generally described, the feed mechanism consists of a supply hopper 50, mounted upon a generally vertical axis and adapted to receive and accumulate the random batches of nails. The hopper includes an open top and an opening 51 at its lower end communicating directly with the conveyer 13. The conveyer in a sense, forms a part of the hopper in that it provides a support for the mass of nails passing downwardly through the discharge opening and imparts vibratory motion to them to promote feeding. It will be noted in Figures 1 and 4 that the sides 52 of the conveyer trough extend upwardly on opposite sides of the supply hopper to prevent the nails from spilling laterally, and that the plane of the conveyer is inclined upwardly from the hopper toward the weigh bucket.

The nails issue from the hopper for advancement across the conveyer by way of the opening 51 which is extended upwardly as at 53 in the vertical front wall of the hopper to provide downward and forward feed. Because of the entanglement of the jumbled masses of nails, the vibration of the conveyer 13 is not always effective to advance them unaided.

For this purpose, a reciprocating plunger 54 having a series of annular grooves which provide substantially square shoulders facing in the forward direction of movement, is mounted the lower portion of the hopper. The plunger is capable of agitating and breaking down the entangled mass and of advancing the nails at a controlled rate through the discharge opening 51 and 53 to the conveyer 13.

As shown in Figure 4, the plunger 54 extends horizontally through the rear wall of the hopper on a horizontal axis aligned with the discharge opening 53. By virtue of the annular grooves and shoulders, it is effective to disentangle the nails and advance them in stepwise progression toward and through the opening toward a yieldable guard or gate 55 adjacent the opening which controls the level of nails in the conveyer. The yieldable mounting of the guard eliminates the chance of the nails becoming caught and bent during the reciprocation of the plunger and prevents damage to the hopper structure. A vertically disposed breaker bar 56 is mounted externally of the hopper in a position adjacent the discharge opening. The lower end of the bar projects downwardly toward the conveyer surface in a position to intercept the flowing stream of nails upon the conveyer and break down any jumbled masses. The yieldable gate and breaker bar thus cooperate to break down any remaining entangled masses of nails which may pass through the discharge opening.

When the batch of nails is disposed in the feed hopper, the conveyer 13 supports the nails and the mass assumes an angle of movement through the discharge opening generally as indicated by the broken line 57 of Figure 4. In order to control the nails and prevent overflow, the conveyer 13 is inclined upwardly toward the discharge end 58; the rearward end of the conveyer trough being provided with an end wall 60 to prevent rearward overflow of nails. It will be noted in Figures 1 and 4 that the conveyer trough side walls 52 extend slightly above the lower edge 51 of the feed hopper.

The serrated plunger 54 extends outwardly from the inclined rear wall 61 of the hopper and is reciprocated by the motor and eccentric driving system 62 as explained later in detail. Thus the mass of nails move downwardly through the hopper and are guided forwardly by the inclined rear wall in a line of motion corresponding generally to the horizontal line of plunger reciprocation. The forward wall 63 of the hopper includes the swinging panel indicated generally at 64 which includes the yieldable guard 55 extending forwardly above the conveyer to prevent side spill of the nails and to control the level of the stream. The breaker bar 56 also is mounted upon the swinging panel in order that it may yield in response to excessive pressure.

As viewed in Figure 5, the side walls 65—65 of the hopper are inclined slightly toward one another downwardly toward the discharge opening. When a batch of nails is dumped into the hopper there is a tendency, by reason of the inclined side walls, for the mass of nails to become jammed between the side walls. This is particularly true with relatively large nails since they tend to jackstraw or bridge across the walls; in some instances preventing them from descending to the discharge opening.

In order to prevent this, the hopper includes a vibrating panel or side wall indicated at 66 located to the interior of the hopper and supported along its upper edge by means of hinges 67—67. Vibratory motion is imparted to the panel by means of an electric vibrator unit indicated generally at 68 which is secured upon the panel and which projects outwardly through an opening 70 formed in side wall 65. Vibrator 68 is of the inertia type having an armature which is free to vibrate and which imparts its vibrations through the housing of the unit directly to the panel upon which it is mounted. The vibrations are transmitted to the nails and are effective to prevent the mass of nails from jamming between the fixed wall and vibrating panel. The vibrations of the panel may be applied intermittently as the need arises and the plunger also may be reciprocated intermittently when needed, both units being effective in concert to feed the nails downwardly through the hopper and through the discharge opening.

For adjustment purposes, the breaker bar 56 includes a pair of vertical slots 71—71 transversed by bolts 72—72 which are secured preferably by welding their heads to the surface of the swinging panel 64. The bar is clamped at its adjusted elevation by means of the nuts 73 which are threaded upon the bolts. Upon loosening the nuts, the bar may be adjusted vertically to suit the size of the nails which the feeder is handling. It has been determined by experiment that the smaller nails require the bar to be set to a low position, while the larger ones require a higher adjustment for most efficient operation. Since the bar is mounted upon the yieldable panel, its free lower end swings outwardly when it engages nails which are entangled and piled up and thus serves to break up the mass for more uniform feeding.

As best shown in Figure 4, the level of the advancing nails is controlled by the cross wall 74 of the yieldable guard 55 since the edge is located at a predetermined elevation above the conveyer 13, thus providing the restricted throat as indicated at 75. It will be apparent, therefore, that the breaker bar and guard cooperate with the conveyer 13 to effectively control the level of nails by disentangling them and distributing them evenly upon the conveyer.

As viewed in Figure 1, the sides of the yieldable guard 55 extend forwardly from the panel 64 and in addition the panel includes side walls 76—76 which extend rearwardly and follow the converging side walls of the hopper. The walls 76 are parallel with and contiguous to the side walls of the hopper; thus, when the advancing nails engage the guard and shift it forwardly, these walls form side extensions of the hopper side walls to prevent side spill of the nails in the area of the angle of motion indicated at 57 in Figure 4.

As best shown in Figure 5, the upper edge of the swinging panel 64 includes a hinge 77 connected by a hinge pin 78 to the cooperating hinge members 80 which are secured upon the front wall 63 of the hopper. The yieldable panel is normally maintained in its retracted position, as shown in Figures 1 and 4, by a spring 81 which is looped upon a pin 82 secured to the side wall 76 of the yieldable guard. Pin 82 includes washers 83—83 (Figure 5) which confine the spring against lateral displacement.

In order to adjust the tension of spring 81, a crank 84 (Figure 8) is rotatably mounted upon the rear wall 61 of the hopper and its shaft is connected by the cable 85 to the spring. The crank 84 is rotatably mounted in a sleeve 86 which is welded to the rear wall of the hopper. As shown, the end of the cable is fastened to the shaft of the crank and is confined between the spaced washers 87—87 welded to the shaft. The crank shaft is locked in adjusted position by means of a pin 88 fastened on the end of the shaft opposite to the crank. The pin normally engages a shoulder 89 which is formed by a spiral cam in the end of a sleeve as shown, and is disengaged to loosen the spring upon being shifted laterally. When the crank 84 is rotated in the direction to tighten the spring 81, the shoulder automatically engages the pin upon each revolution to prevent back rotation under spring tension. In practice, the spring is adjusted experimentally when the mechanism is set up to feed a given nail size, and requires no further attention after being adjusted properly.

The plunger 54 is reciprocated by means of eccentric 90 which is driven by the electric motor 91. The motor is mounted upon an angular framework indicated generally at 92 which is secured upon the inclined rear wall 61 as best shown in Figures 1 and 4. Frames 92 includes a platform 93 for mounting the motor, and further includes a horizontal leg 94 providing a guide for the plunger. The motor is connected by a V-belt 95 to the pulley 96 which is fixed upon the shaft 97 of the eccentric and shaft 97 is journalled in bearings 98 mounted on the framework 92. The motor and pulley drive are arranged to reciprocate the plunger in the neighborhood of 200 strokes per minute.

The oscillation of the eccentric is transmitted to the plunger by way of a rocker arm 100 having a bearing block 101 embracing the eccentric. The bearing block is secured by screws 102 to the rocker arm and includes a bushing 103 providing bearing contact with the eccentric 90. The end of the rocker arm is pivotally mounted as at 104 upon the rear end of the plunger and thus converts the rotary oscillations of the eccentric into lineal plunger movements.

The plunger 54 is slidably mounted for reciprocation in the bearing blocks 105 and 106 which are fastened upon the horizontal leg 94 of the framework. The forward bearing 106 constitutes a packing gland adapted to lubricate the plunger and to clean from it any metallic particles which may be deposited upon it by the nails.

For this purpose, bearing 106 is slidably mounted within a sleeve 107 having its end welded to the inclined hopper wall 61. A flange 108 is welded upon the outer end of sleeve 107 and a similar flange 110 is welded upon the outer end of bearing 106. A series of bolts 111 project outwardly from flange 108 and pass through flange 110. Nuts 112 threaded upon the studs are arranged to force the bearing 106 forwardly so as to compress the packing 113 which is interposed between the end of the bearing and the wall of the hopper.

The packing 113 consists of oakum or equivalent material and a lubricant fitting 114 communicates with the packing by way of the pipe elbow 115. Fitting 114 is of the conventional type adapted to provide a coupled connection with a standard high pressure grease gun to force lubricant into the packing at suitable intervals.

As best shown in Figure 4, the forward end of the plunger, indicated generally at 116, projects through the bearing 106 and end wall, and includes the series of annular grooves noted earlier. Each groove consists of a rearwardly tapered portion 117 which provides a square shoulder 118 facing forwardly in the direction of forward plunger movement. This portion of the plunger is exposed to the mass of nails in the lower portion of the hopper.

By virtue of the rearward taper and forwardly facing shoulders of the annular grooves, a far greater purchase is established with the nails during the forward plunger movement than during its rearward movement. In other words, the tapered portions of the grooves allow the plunger to be retracted with low resistance while agitating the nails which are in contact with it. The forwardly facing shoulders 118 provide a more positive engagement against the shanks and heads of the nails thus imparting a stepwise forward motion to them during sustained reciprocation.

In practice, the plunger may be reciprocated continuously during the feeding operation, or it may be reciprocated only when its action is required to break down masses of entangled nails. For this purpose there may be provided a hand operated timer and also a manual switch, both in electrical connection with the plunger motor. The timer is intended for use particularly when the nails are fed in large batches to the feed hopper and may be set by hand to reciprocate the plunger continuously for controlled time periods. Thus the timer may be set to reciprocate the plunger while feeding the first part of a batch since the bulk of nails naturally tend to pack in the lower portion of the hopper due to the weight load of the nails. The manual switch may be used in place of the timer for intermittent plunger action as the need arises or it may be used to provide continuous plunger action if desired.

The vibrating panel 66 also may be vibrated continuously, or if desired, it may be placed under the control of a second timer to vibrate the panel for a controlled period when the nails are advanced in large batches to the feed hopper. The operation of the vibrating panel also is dependent upon the particular conditions and type of nails, and for this reason, there is also provided a manual switch for selective operation. The structure and operation of the timers and switches is conventional and for this reason they have been omitted from the drawings.

Having described my invention, I claim:

1. A feed mechanism adapted to receive a mass of commingled nails or the like and to feed the nails outwardly at a relatively uniform rate, said feed mechanism comprising a hopper disposed generally upon a vertical axis and having an opening at its upper end adapted to receive the mass of nails, the lower end of the hopper having an opening for discharging the nails, a conveyor disposed below said opening and adapted to advance the nails from the lower portion of the mass confined in the hopper, a panel member loosely mounted in the hopper in a generally vertical plane in a position contacting one side of the mass of nails therein, power means connected to the panel to impart vibratory motion thereto to promote downward motion of the nails in the hopper, a plunger slidably mounted for axial reciprocation on a horizontal axis, said plunger having an end portion passing into the lower end of said hopper in a plane above the conveyor, and means for reciprocating said plunger, whereby the plunger is effective to advance the nails from the lower portion of the mass within the hopper outwardly through said opening for advancement across said conveyor.

2. A feed mechanism adapted to receive a mass of commingled nails or the like and to feed the nails outwardly at a relatively uniform rate, said feed mechanism comprising a hopper disposed generally upon a vertical axis and having an opening at its upper end adapted to receive the mass of nails, the lower end of the hopper having an opening for discharging the nails, a conveyor disposed below said opening and adapted to advance the nails from the lower portion of the mass confined in the hopper, a panel member loosely mounted in the hopper in a generally vertical plane in a position contacting one side of the mass of nails therein, power means connected to the panel member to impart vibratory motion thereto to promote downward movement of the nails in the hopper, a plunger slidably mounted for axial reciprocation on a horizontal axis, said plunger having an end portion passing into the lower end of said hopper in a plane above the conveyor, said plunger having a series of shoulders projecting outwardly from the periphery thereof, said shoulders being adapted to engage and advance the nails in the direction of conveyer advancement, and means for reciprocating said plunger, whereby the plunger is effective to advance the nails from the lower portion of the mass within the hopper outwardly through said opening for advancement across said conveyor.

3. A feed mechanism adapted to receive a commingled mass of nails or the like and to advance said nails outwardly in a relatively uniform stream, said feed mechanism comprising a hopper having side walls, a front wall disposed substantially in a vertical plane, a rear wall which is inclined downwardly and forwardly toward said vertical front wall, said hopper having an open top and having a discharge opening at its lower end extending upwardly into said vertical front wall, a plunger mounted for reciprocation on a horizontal axis in alignment with the opening in said vertical front wall, said plunger having a forward portion passing through said inclined rear wall into the interior of the hopper at the lower portion thereof, means for reciprocating said plunger whereby the plunger is effective to advance the nails in stepwise progression through the opening in said vertical front wall, a vibratory conveyor disposed upon a generally horizontal plane below said discharge opening and adapted to receive the nails issuing therefrom, a yieldable guard mounted upon the hopper externally of the opening in said vertical front wall, said yieldable guard having an end wall disposed in a vertical plane extending across said conveyor at an elevation above the conveyor and being effective to control the depth of the nails advancing upon the conveyor.

4. A feed mechanism adapted to receive a commingled mass of nails or the like and to advance said nails outwardly in a relatively uniform stream, said feed mechanism comprising a hopper having substantially vertical side walls, a front wall disposed substantially in a vertical plane, a rear wall which is inclined downwardly and forwardly toward said vertical front wall, said hopper having an open top and having a discharge opening at its lower end extending upwardly into said vertical front wall, a plunger mounted for reciprocation on a horizontal axis in alignment with the opening in said vertical front wall, said plunger having and passing through said inclined rear wall into the interior of the hopper at the lower portion thereof, means for reciprocating said plunger whereby the plunger is effective to advance the nails in stepwise progression through the opening in said vertical front wall, a conveyor disposed upon a generally horizontal plane below said discharge opening and adapted to receive the nails issuing therefrom, a yieldable guard mounted upon the hopper externally of the opening in said vertical front wall, the yieldable guard including a pair of substantially vertical side walls parallel with and contiguous to the side walls of the hopper and extending forwardly therefrom, said side walls being effective to confine the nails against lateral displacement with respect to the conveyor, a vertical end wall joined to the forward ends of the side walls, said end wall extending across said conveyor at an elevation above the conveyor and being effective to control the depth of the nails advancing upon the conveyor, and yieldable means connected to said guard, said yieldable means being effective to yieldably bias the guard in a direction opposed to the direction of advancement of the nails upon the conveyor whereby the guard is adapted to yield in the direction of nail movement upon advancement by the plunger of a mass of commingled nails.

5. A feed mechanism adapted to receive a mass of commingled nails and to separate and advance the nails at a substantially uniform rate, said feed mechanism comprising a hopper adapted to contain the mass of nails, the hopper being disposed generally upon a vertical axis and having an open upper end and having a discharge opening in its lower portion, said discharge opening being adapted to provide passage of the nails from the hopper in a generally horizontal path of motion, a vibratory conveyor mounted beneath the discharge opening and disposed in a generally horizontal plane, the vibratory conveyor being adapted to receive and advance the nails issuing from the discharge opening, a breaker bar mounted generally upon a vertical axis, said breaker bar being disposed to the exterior of the hopper adjacent said discharge opening and having its lower end extending downwardly across said opening, said breaker bar being disposed in a position to engage and separate the stream of nails advancing through said discharge opening and across the vibratory conveyor and thereby being effective to disentangle the commingled nails which issue through said opening, and a guard mounted on the hopper and extending above the conveyor in the direction of advancement of the nails, the guard having an end wall disposed in a vertical plane above the conveyor and being effective to control the depth of nails advancing upon the conveyor after the nails are engaged and separated by the breaker bar.

6. A feed mechanism adapted to receive a mass of commingled nails and to separate and advance the nails outwardly at a substantially uniform rate, said feed mechanism comprising a hopper adapted to contain the mass of nails, the hopper being disposed generally upon a vertical axis and having an open upper end, the hopper having a vertical end wall and having a discharge opening in the lower portion of said vertical wall, said discharge opening being adapted to provide passage of the nails from the hopper in a generally horizontal path of motion, a vibratory conveyer mounted beneath the hopper and disposed in a generally horizontal plane, the vibratory conveyer being adapted to receive and advance the nails issuing from the discharge opening, a panel having an upper edge hingedly connected to the vertical wall of the hopper externally thereof, the lower edge of said panel being disposed above said discharge opening, spring means connected to said panel adapted to urge the same yieldably toward said vertical end wall, and a breaker bar mounted upon said panel and disposed generally upon a vertical axis, said breaker bar being disposed to the exterior of the panel adjacent said discharge opening and having its lower end extending downwardly across said opening toward the conveyer, said breaker bar being disposed in a position to engage and separate the stream of nails advancing through said discharge opening and across the vibratory conveyer and thereby being effective to disentangle the commingled nails which issue through said opening.

7. A feed mechanism adapted to receive a mass of commingled nails and to separate and advance the nails outwardly at a substantially uniform rate, said feed mechanism comprising a hopper adapted to contain the mass of nails, the hopper being disposed generally upon a vertical axis and having an open upper end, the hopper having a vertical end wall and having a discharge opening in the lower portion of said vertical wall, said discharge opening being adapted to provide passage of the nails from the hopper in a generally horizontal path of motion, a vibratory conveyor mounted beneath the hopper and disposed in a generally horizontal plane, the vibratory conveyor being adapted to receive and advance the nails issuing from the discharge opening, a panel having an upper edge hingedly connected to the vertical wall of the hopper externally thereof, the lower edge of said panel being disposed above said discharge opening, spring means connected to said panel adapted to urge the same yieldably toward said vertical end wall, a breaker bar mounted upon said panel and disposed generally upon a vertical axis, said breaker bar being disposed to the exterior of the panel adjacent said discharge opening and having its lower end extending downwardly across said opening toward the conveyer, said breaker bar being disposed in a position to engage and separate the stream of nails advancing through said discharge opening and across the vibratory conveyor and thereby being effective to disentangle the commingled nails which issue through said opening and a guard mounted on the panel and extending above the conveyer in the direction of advancement of the nails, the guard having an end wall disposed in a vertical plane above the conveyor and being effective to control the depth of nails advancing upon the conveyer after the nails are engaged and separated by the breaker bar, said panel providing a yieldable support adapting the breaker bar and guard to yield in the direction of the advancing nails upon engaging commingled masses of nails.

8. A feed mechanism adapted to receive a mass of commingled nails or the like, and to feed the nails outwardly at a relatively uniform rate, said feed mechanism comprising a hopper disposed generally upon a vertical axis and having an open upper end adapted to receive the mass of nails, the hopper having a pair of side walls, a front wall disposed substantially in a vertical plane, a rear wall which is inclined downwardly and forwardly toward said vertical front wall, said hopper having a discharge opening at its lower end extending upwardly into said vertical front wall, a panel disposed in the interior of the hopper in contiguous relationship to one of said side walls and adapted to contact the nails in the hopper, said panel having an edge hingedly connected to the side wall, a power operated device connected to said panel and adapted to impart vibratory motion thereto, and thereby promote the movement of the nails downwardly through the hopper toward the discharge opening, and a vibratory conveyer disposed upon a generally horizontal plane below said discharge opening and adapted to receive and advance the nails issuing from the discharge opening.

9. A feed mechanism adapted to receive a mass of commingled nails or the like, and to feed the nails outwardly at a relatively uniform rate, said feed mechanism comprising a hopper disposed generally upon a vertical axis and having an open upper end adapted to receive the mass of nails, the hopper having a pair of side walls, a front wall disposed substantially in a vertical plane, a rear wall which is inclined downwardly and forwardly toward said vertical front wall, said hopper having a discharge opening at its lower end extending upwardly into said vertical front wall, a panel disposed in contiguous relationship to one of said side walls upon the interior of the hopper, said panel having its upper edge hingedly connected to the side wall, a power operated vibrator connected to said panel and adapted to impart vibratory motion thereto, and thereby promote the movement of the nails downwardly through the hopper toward the discharge opening, a plunger mounted for reciprocation on a horizontal axis in axial alignment with the discharge opening of said vertical front wall, the plunger having a forward portion passing through said inclined rear wall into the interior of the hopper, means for reciprocating said plunger whereby said plunger is effective to advance the nails in stepwise progression toward and through said discharge opening, a vibratory conveyer disposed upon a generally horizontal plane below said discharge opening and adapted to receive and advance the nails issuing therefrom, a yieldable guard mounted upon the hopper externally of the opening in said vertical front wall, said yieldable guard having an end wall disposed in a vertical plane and extending across said conveyer at an elevation above the conveyer and being effective to control the depth of nails advancing upon the conveyer.

10. A feed mechanism adapted to receive a mass of commingled nails or the like, and to feed the nails outwardly at a relatively uniform rate, said feed mechanism comprising a hopper disposed generally upon a vertical axis and having an opening at its upper end adapted to receive the mass of nails, the hopper having an opening in its lower end for discharging the nails, a vibratory conveyer disposed generally in a horizontal plane below said opening and adapted to sustain the mass of nails in the lower portion of the hopper, a plunger slidably mounted for reciprocation on a horizontal axis, said plunger having an end portion passing into the lower portion of said hopper in a plane above the conveyer, said hopper having a vertical end wall including a discharge opening disposed beyond the forward end portion of said plunger in alignment with the horizontal axis of the plunger and communicating with said conveyer, the forward end portion of said plunger having a series of annular grooves which taper rearwardly from the forward end of the plunger, said grooves delineating a series of shoulders which face forwardly in the direction of the discharge opening, said shoulders being adapted to engage and advance the nails in the hopper toward the discharge opening during the forward motion of the plunger toward said opening, said tapered grooves being adapted to engage and agitate the nails in the hopper during the rearward motion of the plunger.

11. A feed mechanism adapted to receive a commingled mass of nails or the like, and to feed said mass outwardly at a relatively uniform rate, said feed mechanism comprising a hopper having generally vertical walls and having an opening at its upper end to receive the mass of nails, the lower end of the hopper having a downwardly facing opening, a power driven conveyor disposed generally in a horizontal plane below said downwardly facing opening in position to partially sustain the mass of nails in the hopper, a power driven nail vibrating member residing within the hopper in a generally vertical plane in position impart vibratory motion to the mass of nails therein and thereby promote the movement of the nails downwardly through the hopper, a power driven plunger element slidably mounted for reciprocation along a generally horizontal axis and having a forward end portion passing into the lower portion of the hopper in a plane above the said downwardly facing opening and conveyor, the hopper having one wall residing beyond the forward end of the plunger element, said wall having a lower edge spaced above the conveyor and delineating a discharge opening communicating with the conveyor and located generally in alignment with the plunger element, whereby the plunger element is effective to advance the nails from the lower portion of the mass within the hopper and outwardly through said discharge opening, the conveyor advancing in a direction to convey the nails outwardly from the discharge opening, and a guard member having an end portion extending transversely across the conveyor and spaced outwardly from the said discharge opening, the said end portion spaced above the conveyor a distance less than the spacing of the said lower edge of the hopper wall above the conveyor, whereby the said end portion controls the depth of nails advancing on the conveyor.

References Cited in the file of this patent

UNITED STATES PATENTS

| | | |
|---|---|---|
| 1,356,587 | Aygarn | Oct. 26, 1920 |
| 1,512,519 | Beall | Oct. 21, 1924 |
| 2,389,566 | Thomas | Nov. 20, 1945 |
| 2,446,752 | Fiddyment | Aug. 10, 1948 |
| 2,539,070 | Gebo | Jan. 23, 1951 |
| 2,588,030 | Musschoot | Mar. 4, 1952 |